United States Patent [19]

Sugino

[11] Patent Number: 5,076,718
[45] Date of Patent: Dec. 31, 1991

[54] DATA CARD FOR SERIAL PRINTER

[75] Inventor: Koichi Sugino, Tokyo, Japan

[73] Assignee: Seikosha Co., Ltd., Tokyo, Japan

[21] Appl. No.: 634,373

[22] Filed: Dec. 27, 1990

Related U.S. Application Data

[62] Division of Ser. No. 530,686, May 30, 1990.

[30] Foreign Application Priority Data

May 31, 1989 [JP] Japan .................................. 1-138518

[51] Int. Cl.$^5$ ............................................. B41J 11/44
[52] U.S. Cl. ..................................... 400/76; 400/283;
400/583.3; 400/282; 235/437; 235/456;
235/494
[58] Field of Search ...................... 400/76, 73, 70, 279,
400/280, 281, 282, 582, 252, 583, 583.1, 583.4,
583.3, 283; 235/487, 479, 494, 454, 456,
432–433, 435, 438, 436–437, 375, 45; D14/117

[56] References Cited

U.S. PATENT DOCUMENTS

| | | | |
|---|---|---|---|
| 3,284,929 | 11/1966 | Azure, Jr. ............................ | 235/487 |
| 3,414,103 | 12/1968 | Knudsen et al. ..................... | 400/283 |
| 3,528,059 | 9/1970 | Spanjersberg ....................... | 235/456 |
| 3,573,436 | 4/1971 | Berler ................................. | 235/494 |
| 3,656,601 | 4/1972 | Abell, Jr. ............................ | 400/281 |
| 3,700,858 | 10/1972 | Murthy .............................. | 235/494 |
| 3,822,375 | 7/1974 | Ozeki et al. ......................... | 235/432 |
| 4,362,928 | 12/1982 | Sheldon .............................. | 235/494 |
| 4,430,563 | 2/1984 | Harrington ......................... | 235/494 |
| 4,471,217 | 9/1984 | Engel ................................. | 235/494 |
| 4,541,337 | 9/1985 | Sehaur .............................. | 400/583.3 |
| 4,564,302 | 1/1986 | Hatazawa ............................ | 400/76 |
| 4,856,924 | 8/1989 | Sugino ............................... | 400/283 |
| 4,902,880 | 2/1990 | Garczynski et al. ................ | 235/494 |
| 5,001,330 | 3/1991 | Koch .................................. | 235/494 |
| 5,004,896 | 4/1991 | Serrell et al. ....................... | 235/456 |

FOREIGN PATENT DOCUMENTS 0130975 5/1977 Fed. Rep. of Germany ...... 235/487

Primary Examiner—Eugene H. Eickholt
Attorney, Agent, or Firm—Jordan and Hamburg

[57] ABSTRACT

A data card for a printer includes a plurality of data areas. Data readable by a sensor can be written in the data areas to control specifications or functions of a serial printer. A standard mark is printed on the data card to provide a reference position. The serial printer includes the data card, a card receiver into which the data card is detachably inserted, a sensor for reading data written in the data card, and a carriage having a printing head thereon. Either the card receiver or the sensor is mounted to the carriage. The other component is fixedly arranged within the serial printer. The serial printer further includes a memory for storing the data, and a controller for controlling a printing mechanism according to the data stored in the memory.

4 Claims, 6 Drawing Sheets

DATA CARD FOR SERIAL PRINTER

This is a division of application Ser. No. 07/530,686, filed May 30, 1990.

BACKGROUND OF THE INVENTION

The present invention relates to a data card for use in a serial printer, and to a serial printer using such a card.

Attempts have recently been made to substantially improve the functions of an office or business printer so as to change typefaces and line spacings or to alter emulation and protocol by external means. However, such functions or specifications must be established or changed whenever such a printer is connected to different computers or different application software is employed. A known printer typically includes a multiplicity of changeover switches such as a dip switch. Those switches may be fixedly mounted to the rear side of the printer or within the printer. A specialist or a user must operate such switches to change its functions whenever a different computer or software is used.

The use of dip switches requires a corresponding number of inlet ports in a control circuit. This complicates the structure of a printer. A circuit pattern for a dip switch may have an effect on the design of a control circuit board and requires a larger circuit board. Due to limited space, the dip switches have to be very small, but this adversely affects the operability of the changeover switches. In fact, a user must depend on a manual of a serial printer whenever he is unable to understand which switches are related to which functions. The dip switches are relatively expensive in light of their functions, thereby increasing the cost of the serial printer.

SUMMARY OF THE INVENTION

It is a primary object of the invention to provide a data card which can change the specifications or functions of a serial printer without the need for dip switches, thus reducing the manufacturing cost of such a serial printer.

It is another object of the invention to provide a serial printer using a data card which is simple in operation, is highly reliable, is economical to manufacture, and is compact.

In order to achieve the foregoing objects, a data card for use in a serial printer, according to the present invention, has data areas so formed that data readable by a detection device mounted in the printer can be written to control specifications and functions of the serial printer.

The serial printer comprises a data card, a card receiver into which the data card is detachably inserted, and a detection device for reading data written in the data card. Either the card receiver or the detection device is fixedly arranged within the printer. The other component is mounted on a carriage which in turn is provided with a printing head thereon. The serial printer further includes memory means for storing the data read by the detection device and control means for controlling a printing mechanism in accordance with data stored in the memory means.

BRIEF DESCRIPTION OF THE DRAWINGS

A better understanding of the invention may be had by reference to the following detailed description when taken in conjunction with the accompanying drawings, in which.

DESCRIPTION OF THE PREFERRED EMBODIMENT

Figure 1:
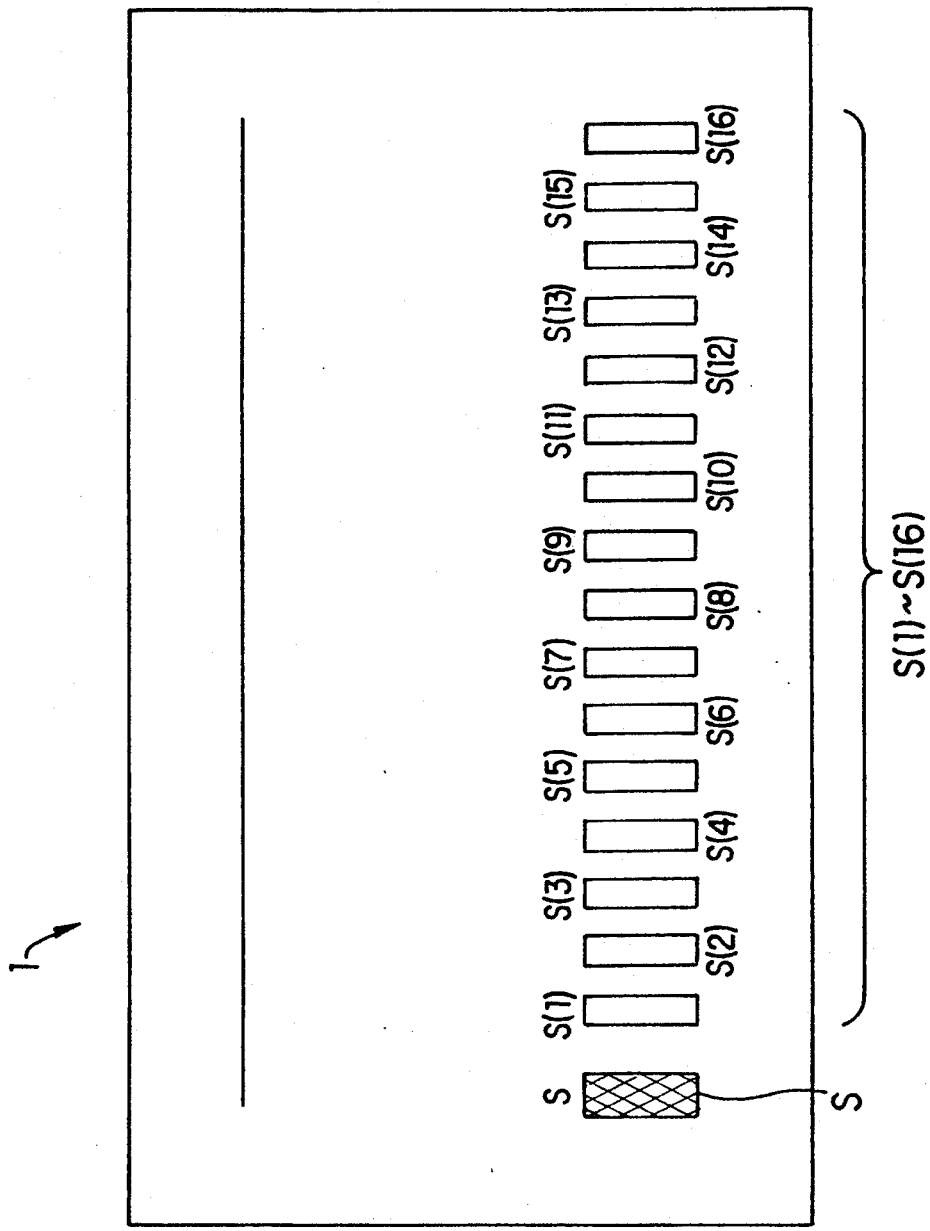
FIG. 1 is an enlarged front view of a data card according to the present invention.

With reference to FIG. 1, therein is shown, on an enlarged scale, a data card 1 according to the present invention. The data card 1 has a standard mark S adjacent to its lower edge to provide a reference or standard position. Beside the standard mark S, there are provided a plurality of rectangular blanks such as data areas S(1) to S(16) to control the desired specifications and functions of a printer. A user may use a pencil and the like to fill in the rectangular blanks. The width of each of the data areas S(1) to S(16) and the distance between adjacent data areas are one tenth of an inch. Six pulses to the motor are necessary to move a carriage 3 (FIG. 2) such a distance. The carriage 3 is driven by a carriage motor 15 (FIG. 5) in one embodiment of a printing mechanism. Also, the width of the standard mark S and the distance between the standard mark S and the nearest data area S(1) are three twentieths of an inch. Nine pulses are necessary to move the carriage 3 such a distance by means of the carriage motor.

An explanation of available functions of the printer, although not shown, is provided above the data areas S(1) to S(16).

Figure 2:
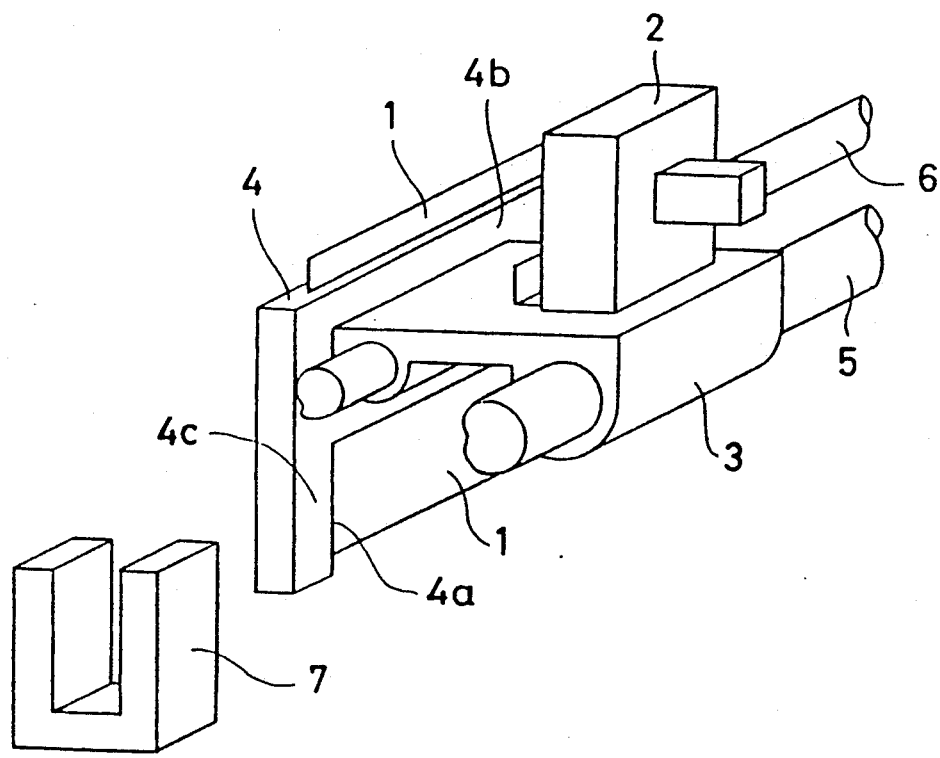
FIG. 2 is a perspective view showing the principal part of a serial printer according to the present invention.
Figure 3:
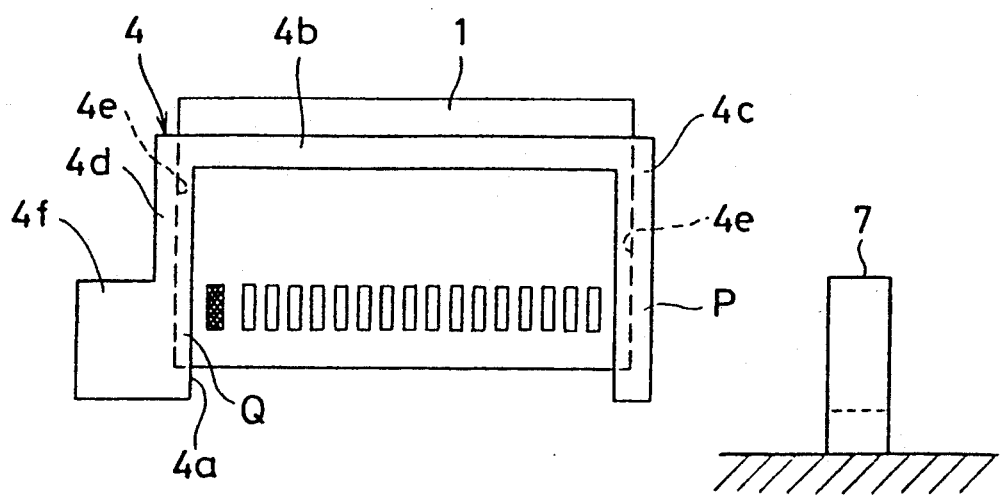
FIGS. 3 and 4 are rear views each showing the principal part of the serial printer.
Figure 4:
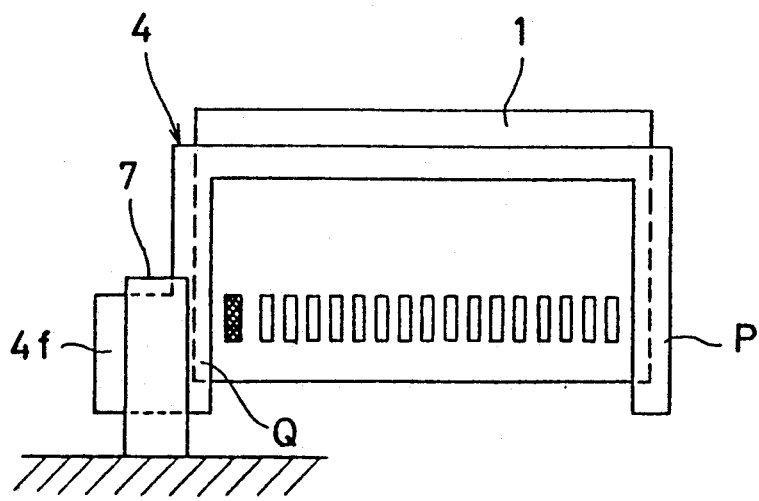

FIG. 2 is a perspective view showing the principal part of a serial printer constructed according to the present invention and using the data card 1. A printing head 2 is mounted on the carriage 3 and forms part of the printing mechanism. The carriage 3 has an integral card receiver 4 which is of an inverted U shape as shown in FIGS. 3 and 4. The card receiver 4 has a central opening 4a. An upper edge 4b and opposite side edges 4c and 4d of the card receiver 4 collectively form a slot 4e into which the data card 1 is inserted. The side edge 4d has a detecting portion 4f at its lower end, the width of the detecting portion 4f being greater than that of the side edge 4c. The carriage 3 is driven by the carriage motor 15 and moved horizontally along two guide shafts 5 and 6. As stated earlier, the width of the side edge 4c is less than that of the detecting portion 4f. To this end, the total number of pulses necessary to move the carriage by a distance corresponding to the width of side edge 4c is less than twenty, and by a distance corresponding to the width of the detecting portion 4f is more than twenty.

The serial printer includes a mounting plate (not shown) to which a sensor or detection device 7 is fixed to detect an initial or home position. The detection device 7 is of a U shape and may be a photointerrupter. During movement of the carriage 3, the card receiver 4 passes through a recess formed in the detection device 7.

Figure 5:
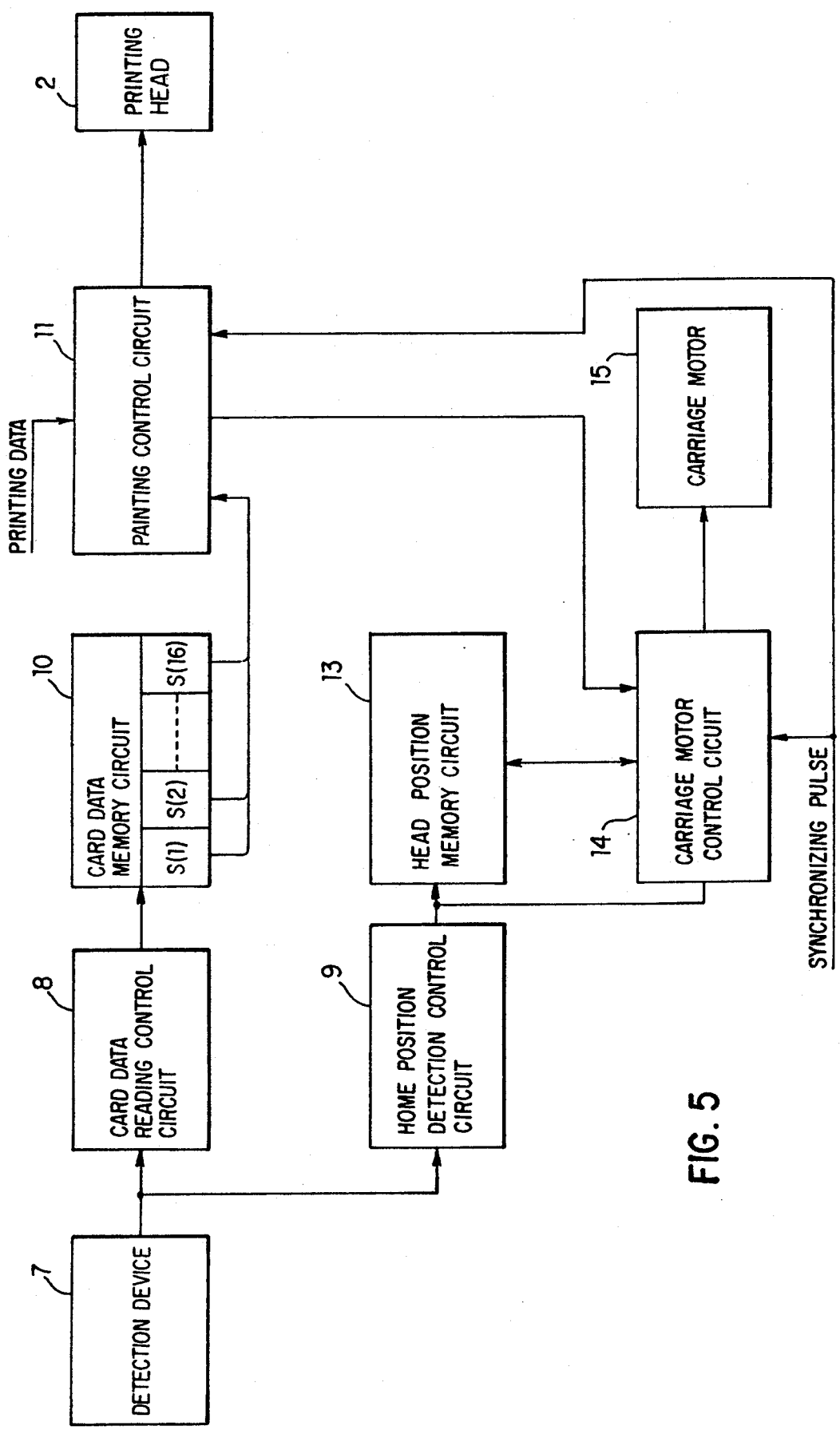
FIG. 5 is a block diagram of a circuit in accordance with the invention.

FIG. 5 is a block diagram of a circuit in accordance with the invention. As illustrated, the detecting device 7 sends an output signal to a card data reading control circuit 8 and a home position detection control circuit 9. Data contained in the data areas S(1) to S(16) of the data card 1 are read in the card data reading control circuit 8 and correspondingly stored in addresses of a card data memory circuit 10 as an example of memory means. In accordance with the data stored in the card data memory circuit 10, the printing is printed by the printing head 2 under the control of a printing control circuit 11 as an example of a control means. The home position detection control circuit 9 sends an output signal to both a head position memory circuit 13 and a carriage motor control circuit 14. The carriage motor control circuit 14 is structured to control the carriage motor 15. The head position memory circuit 13 includes a counter which accumulates totals of the number of drive pulses to be supplied to the carriage motor 15.

Figure 6:
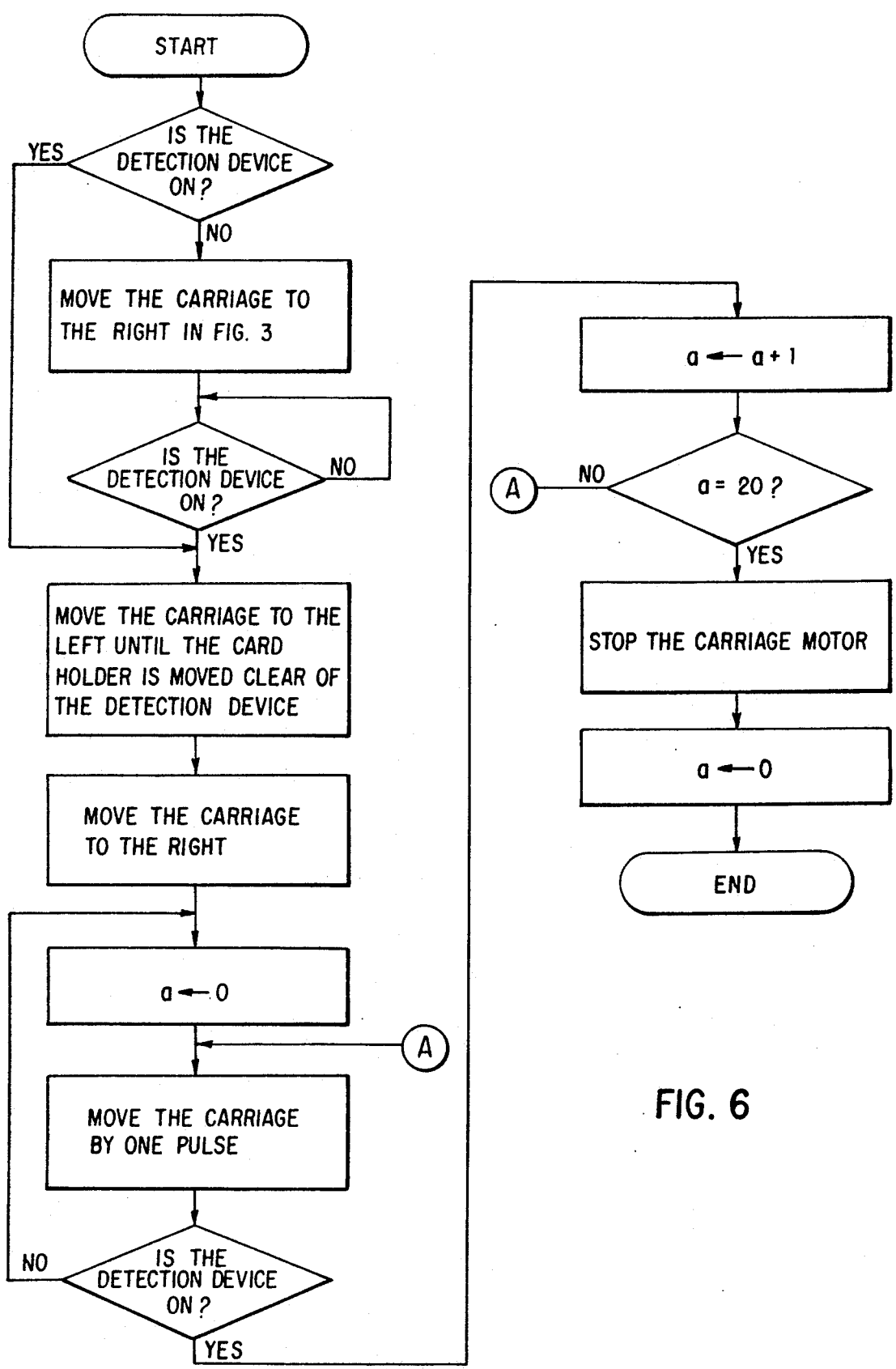
FIG. 6 is a flow chart showing the manner in which a printing head of the serial printer is returned to its home position.

With reference to FIG. 6, the flow chart shows the manner of sensing that the carriage 3 is held in a home position. When the detection device 7 is not in an on state, the carriage 3 is moved to the right in FIG. 3 while the carriage motor 15 is being controlled by the carriage motor control circuit 14. The carriage 3 continues moving to the right until the detection device 7 is on, and is stopped when the detection device 7 is on. The carriage 3 is then moved to the left until the card receiver is moved clear of the detection device 7. The carriage 3 is again moved to the right, and the counter in the head position memory circuit 13 is reset to zero. The carriage 3 is moved by a distance corresponding to one pulse until the detection device is on while the counter is continuously reset to zero. A one is added to a counter value a when the detection device 7 is on. The sum is now considered to be the counter value a. This process is continued until the counter value a becomes twenty (a=20). The detection device 7 is on when it senses a right end P of the side edge 4c of the card receiver 4, when it senses a right end Q of the detecting portion 4f of the card receiver 4, and when it senses any of the data areas S(1) to S(16) where the blanks are filled. Assuming that the right edge P is sensed by the detection device 7, it then assumes the on state, as just noted. When the side edge 4c has passed through the detection device 7, it is changed to be in an off state. As stated earlier, the total number of pulses required to move the carriage by the width of the side edge 4c is less than twenty. Therefore, the side edge 4c passes therethrough before the counter value a reaches twenty. The counter value a is again reset to zero, and the carriage 3 is moved by a distance corresponding to one pulse. This is the case when the detection device 7 senses any of the data areas S(1) to S(16) where the blanks are filled. Thereafter, when the right edge Q is sensed, the detection device 7 assumes an on state. The width of the detecting portion 4f is greater than that of the side edge 4c, and more than twenty pulses are needed to move the carriage by the width of the detecting portion 4f, as stated earlier. Thus, the detection device 7 remains on even if the counter value a reaches twenty. At this time, the carriage motor 15 is rendered inoperative, and the counter value a of the counter in the head position memory circuit 13 is reset to zero. The carriage 3 is now held in a home position. By counting the number 2 drive pulses of the carriage motor 15, the position of the printing head 2 can be found.

Figure 7:
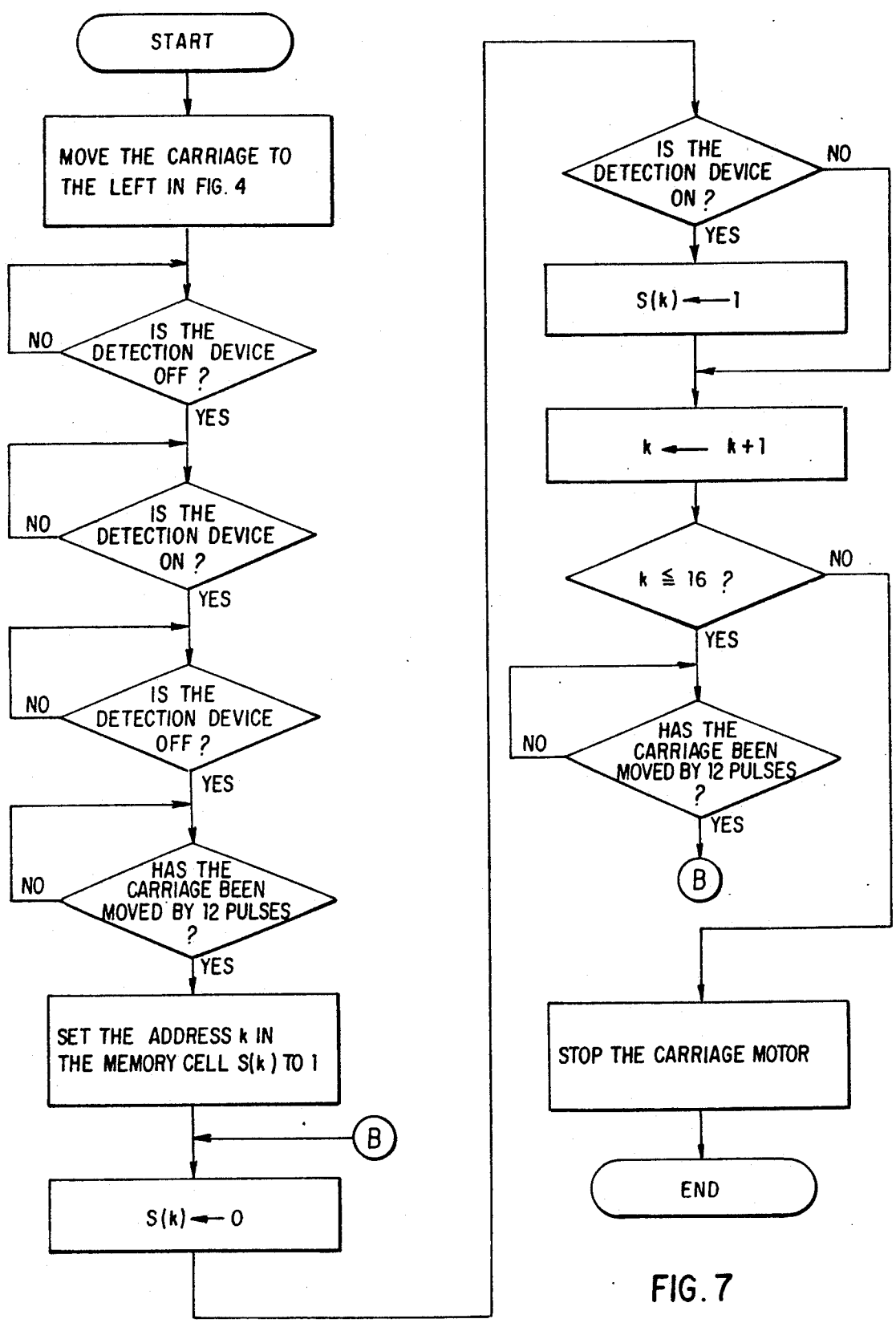
FIG. 7 is a flow chart showing the manner in which data in the data card is read.

FIG. 7 is a flow chart showing the manner of controlling the reading of the data card 1. First, the carriage 3 is moved to the left from its home position shown in FIG. 4. The detection device 7 assumes an off state when the end Q of the detecting portion 4f of the card receiver 4 is moved clear of the detection device 7. As the carriage 3 continues moving to the left, the detection device 7 assumes an on state when the standard mark S has been detected. The detection device 7 again assumes an off state when the right end of the standard mark S has been detected. Counting will then be initiated. When the carriage 3 is moved by a distance corresponding to twelve drive pulses, or when the center of the data area S(1) of the data card 1 is moved to face the detection device 7, then a one is applied to an address K in a memory cell S(k) in the card data memory circuit 10. The next step is to clear the memory cell S(k) If this data area is filled, and the detection device is on, then a one is stored in the memory cell S(k). Next, the address K is set to k+1. If the value of K is sixteen or less (K=16), the carriage 3 is moved by a distance corresponding to twelve pulses. While this process is repeated, data in the data areas S(1) to S(16) will be successively stored in corresponding memory cells. When the value of K is greater than sixteen, then the carriage motor 16 is stopped. Reading of the data card 1 is now completed, and all the data in the data areas S(1) to S(16) have been stored in the card data memory circuit 10. Thereafter, the printing control circuit 11 is operative to control the printing head 2 and the carriage motor 15 according to these data.

It will be understood that the width of each of the side edge 4c, the detecting portion 4f, and the data areas S(1) to S(16) and the distance between the respective elements as well as the width of the standard mark and the distance between the standard mark and the nearest data area are not restricted to the disclosed embodiment. This is the case of the number of pulses necessary to move the carriage by a certain distance, as long as the same advantages can be obtained. Also, the total number of the data areas need not necessarily be sixteen.

In the illustrated embodiment, the detection device is fixedly arranged within the printer. Alternatively, the card receiver may be fixedly arranged within the printer, and the detection device may be mounted to the carriage.

The data card may be made from a material which can screen light, and a slide is inserted to provide data.

When a single serial printer is connected to different computers, several data cards are selectively changed, so that data in the selected data card can be read to determine specifications or functions suitable for the computer to which the serial printer is now connected.

In the illustrated embodiment, the printing mechanism includes the printing head 2 and the carriage motor 15. Other components such as a line feed motor may be included in the printing mechanism and controlled by the control means 11.

The data card of the present invention constructed in the above manner permits easy writing of data for altering the specifications or functions of the serial printer, and requires no cumbersome dip switches, thus improving the operability of the serial printer as well as reducing the manufacturing cost thereof.

The serial printer according to the present invention is easily operable to determine specifications or functions, is highly reliable, is economical to manufacture, and is compact. With a plurality of data cards, the serial printer is instantaneously adaptable to different computers and the like, thus improving its maneuverability.

Although the preferred embodiment of the invention has been described in detail, it should be understood that various changes, substitutions, and alterations can be made therein without departing from the spirit and scope of the invention as defined by the appended claims.

What I claim is:

1. A data card for use in a serial printer, comprising data areas positioned to be readable by a single detection device in the serial printer for controlling specifications and functions of the serial printer, said card having only one reference mark for providing a reference position, said data areas extending in only one row, in a given direction from said reference mark.

2. A data card for use in a serial printer according to claim 1, adapted to be read while moved in said given direction, wherein said data card has a side edge, said reference mark comprises a standard mark placed adjacent to said side edge of said card, and said row of data areas extend in a direction parallel to said side edge of said card.

3. A data card for controlling a serial printer and being adapted to be moved in a given direction, said data card having a side edge parallel to said given direction, a permanent reference mark thereon and a plurality of data areas extending in said given direction from said reference mark, said data areas being spaced apart by equal distances and having widths in said direction equal to said distance, said data areas being of a material to accept marks placed thereon by a user.

4. The card of claim 3 wherein the dimension of said reference mark and the distance from said reference mark to the nearest data area, in said direction, are equal to one another, and are different than the dimension of said data areas in said direction.

* * * * *